Figure 1:
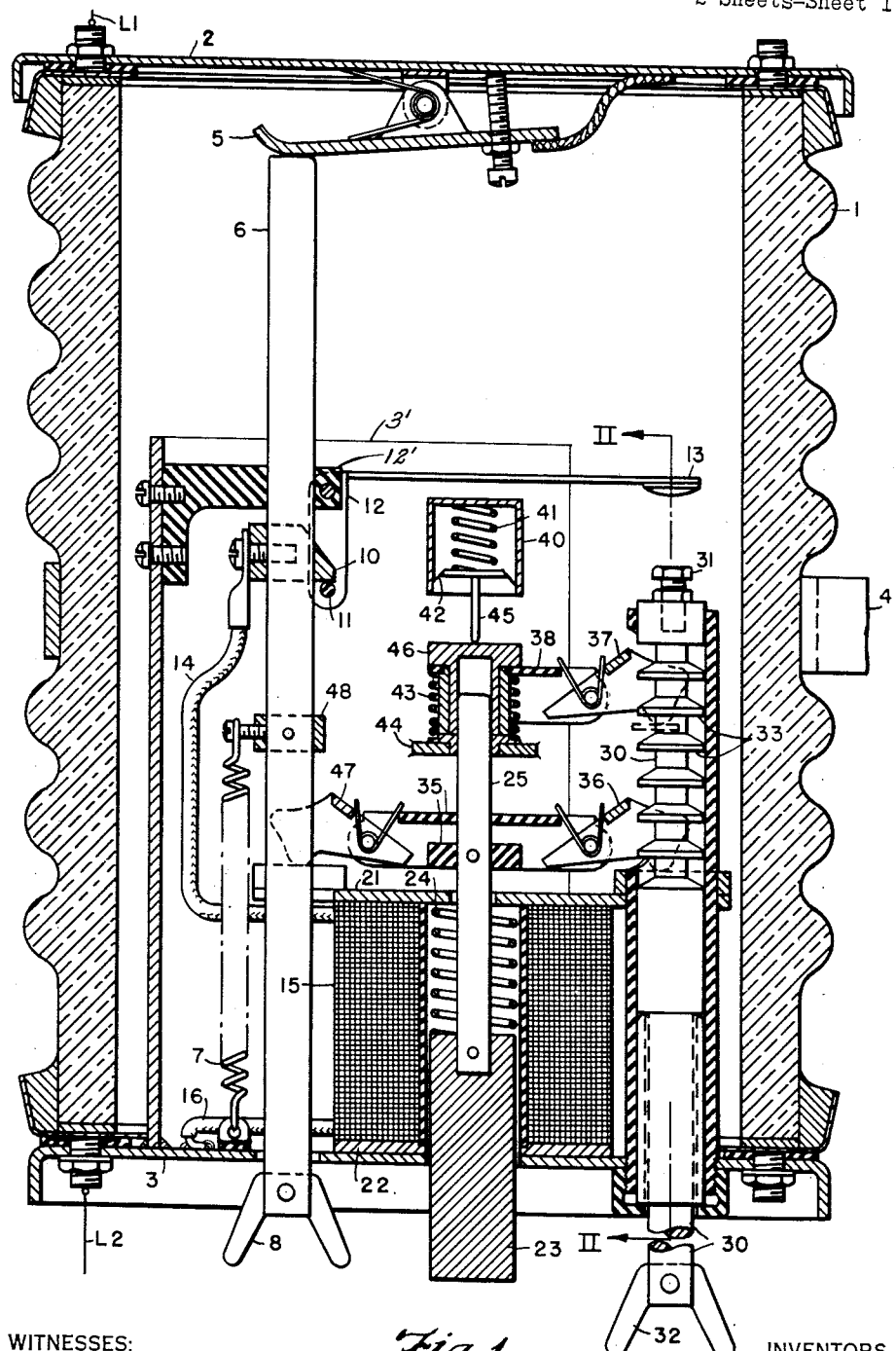

Jan. 5, 1954 — A. W. EDWARDS ET AL — 2,665,346
COUNTING MECHANISM FOR LINE SECTIONALIZERS
Filed July 21, 1950 — 2 Sheets-Sheet 1

WITNESSES:

INVENTORS
Andrew W. Edwards and
Earl F. Beach.
BY
ATTORNEY

Patented Jan. 5, 1954

2,665,346

UNITED STATES PATENT OFFICE 2,665,346

COUNTING MECHANISM FOR LINE SECTIONALIZERS

Andrew W. Edwards, East McKeesport, and Earl F. Beach, Pittsburgh, Pa., assignors to Westinghouse Electric Corporation, East Pittsburgh, Pa., a corporation of Pennsylvania Application July 21, 1950, Serial No. 175,273

13 Claims. (Cl. 200—108)

Our invention relates to novel time-delayed resetting-means for automatically resetting the integrators or counting-mechanisms of line-sectionalizers. With slight modifications, however, the invention could be used in the counting-mechanisms of reclosers or other devices.

Line-sectionalizers and reclosers are used on rural distribution-lines. The recloser is used between the distribution-line and the electric power-source. This recloser responds to predetermined overcurrent-conditions, indicative of a fault, and quickly opens its line-contact, after which it quickly recloses said contact, and if the fault has not automatically cleared itself during the period of deenergization of the line, the recloser quickly again opens its line-contact, and keeps up this process for a predetermined number of rapidly repeating cycles, usually four, and if the fault still persists this time, the recloser opens up its line-contact and locks it open, thereby permanently deenergizing the line until the line can be repaired. The function of the line-sectionalizer is to break up the line into sections, each section being controlled by a sectionalizer, which counts a predetermined rapid succession of overcurrent-conditions, for a number of times which is less than the recloser-times, and then opens its sectionalizer-contact during a no-current period of the recloser. In this way, a faulted section is removed by the sectionalizer, before the recloser permanently trips out the entire distribution-system.

In the case of both the recloser and the sectionalizer, it is necessary for the integrator or automatic counting-mechanism to be self-resetting. Ordinarily, this resetting is accomplished by slowly biasing a forwardly-ratcheted counter-member so that it will slowly return to its original unadvanced position whenever it is displaced at all. This requires some sort of time-delay device for resetting the counter-mechanism. Oil-dashpots for this purpose present problems of oil-leakage, evaporation, etc. Mechanical timers are usually too expensive for these applications. Air-dashpots for resetting the counter-member have the disadvantage of an inherently short travel and considerable backlash, so that it is difficult to use such air-dashpots directly on the forwardly ratcheted counter-member, so as to allow said counter-member to integrate its travel, and still allow resetting.

In accordance with our present invention, we provide a step-by-step counter-member which is instantaneous in its movements, both in the advance-stepping or counting direction, and in the resetting direction. A holding-detent is used, for holding this counter-member in advanced positions, and a time-delay device is used for making this holding-detent inoperative within a predetermined time after the counter-device is set into operation. In this way, it is possible to make the parts of the counter-mechanism very inexpensively, without any provision for the close-fitting tolerances and the avoidance of rust which are characteristic of time-delayed devices, and at the same time, we can use the simplest kind of short-stroke light-duty dashpot or other time-delay means for tripping the counter-mechanism back to its unadvanced reset position at the end of a predetermined time after the counter starts to function.

Figure 2:
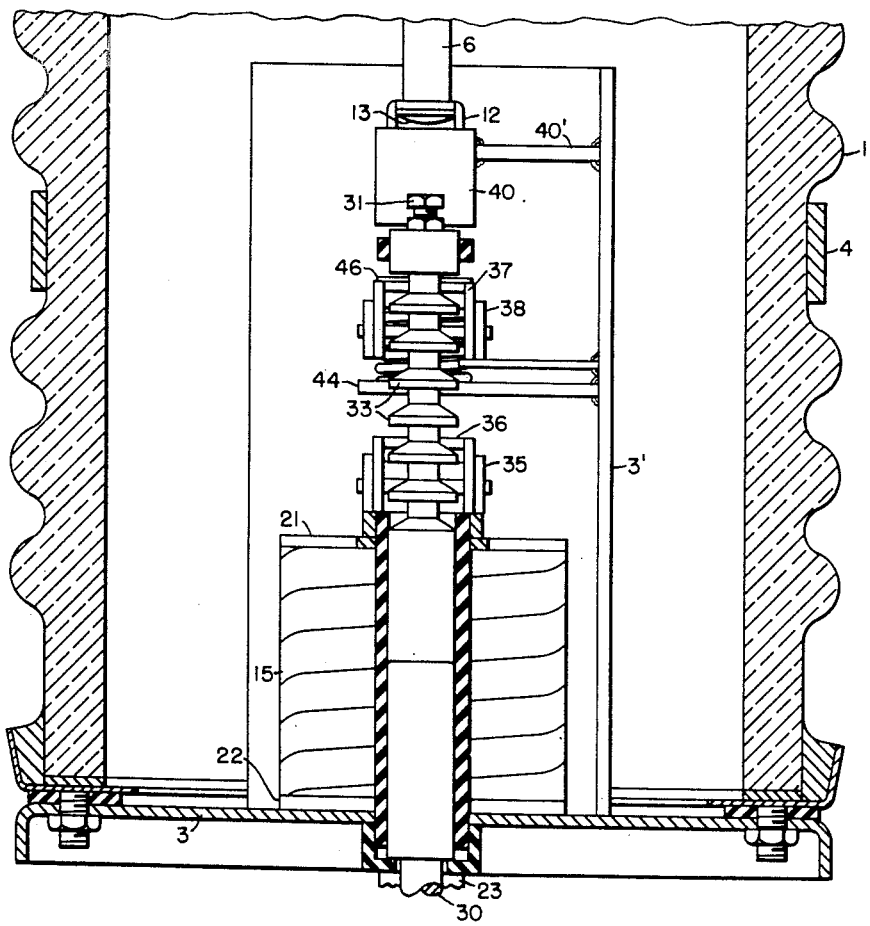

With the foregoing and other objects in view, our invention consists in the systems, combinations, apparatus, parts, and methods of design and operation, hereinafter described and claimed, and illustrated in the accompanying drawing, in Fig. 1 which is a somewhat diagrammatic elevational view, partly in section, showing an illustrative form of embodiment of our invention; and Fig. 2 is a partial view in section taken along the line II—II of Fig. 1.

The drawings are intended more to illustrate the principle of the invention, rather than its precise structure. While the invention is shown in the drawing, and will be described, as being embodied in a line-sectionalizer, it is to be understood that the counting-mechanism part of the illustrated structure, to which our invention particularly relates, may be used also in reclosers and perhaps also in other devices, with suitable modifications.

The illustrated line-sectionalizer is shown as being mounted in a cylindrical porcelain insulator 1, which normally stands in an essentially vertical position. One of the line-terminals, L1, is connected to the top-plate 2 of the sectionalizer, while the other line-terminal, L2, is connected to the bottom plate 3 of the sectionalizer. The sectionalizer is supported by a centrally located mounting-bracket 4, which is usually secured somewhere up on a pole (not shown).

On the underside of the top-plate 2 is shown the spring-pressed stationary contact-member 5 of the sectionalizer-contact or disconnect-switch, which is connected in series with the distribution-line. The movable contact-member of this combination is shown in the form of a vertically movable contact-rod 6, which normally presses up into contact with the stationary contact 5. The contact-rod 6 is normally biased downwardly, in a contact-opening direction, not only by its own weight, but also by a tension-spring 7. The bottom end of the contact-rod extends down below the bottom plate 3, and is provided with a looped operating-terminal or hookeye 8 which can be engaged by a switch-stick (not shown) for manually reclosing the sectionalizer-contact.

An intermediate portion of the vertically movable contact-rod 6 is provided with a shoulder 10 which is engaged by the latch-pin 11 of a pivotally supported latch-member 12, which is supported by means of insulation 12' on an L-shaped bracket 3' secured to bottom plate 3, and is provided with a horizontally extending arm 13 which has to be pushed up in order to release the latch-pin 11 from its normal position under the rod-shoulder 10.

The vertically movable contact-rod 6 is also provided with a flexible current-carrying cable 14 which is secured to one end of a magnetizing coil 15, the other terminal of which is connected to the base-plate 3, as indicated at 16.

The magnetizing coil 15 is a part of an electromagnet device which has upper and lower pole-piece plates 21 and 22, and also a vertically movable armature 23 which moves vertically inside of the coil 15. In the illustrated embodiment of our invention, the armature 23 is biased downwardly, into its normal unattracted position, by means of its own gravity, supplemented by a compression-spring 24. The armature 23 is provided with an upstanding axially disposed armature-bar 25 which serves as the operating-member of our device. This operating-member or armature-bar 25 moves up and down between a predetermined retracted lower position, as shown, and an advanced upper position when the top of the armature 23 is attracted magnetically up to, or nearly to, the top pole-face plate 21 of the electromagnet structure.

Slidably mounted at one side of the magnetizing coil 15, is a vertically movable counter-bar 30, which is normally biased, as by gravity, to its lowermost position, and which is upwardly advanceable, in discrete steps, until its top end 31 pushes up on the latch-arm 13 and unlatches the vertically movable contact-rod or trip-rod 6. The lower end of the counter-bar 30 extends below the sectionalizer-bottom 3, and is provided with a looped operating-terminal or hookeye 32, which may be engaged by a switch-stick (not shown) for manually pushing up on the counter-rod 30 and tripping out the sectionalizer. The upper portion of the counter-rod 30 is provided with a series of vertically spaced notches or shoulders 33, which are used in the step-by-step vertical advancement of the counter-rod, and also in temporarily holding the counter-rod in advanced position, as will be subsequently described.

The previously mentioned upstanding armature-rod 25 has an intermediate portion which carries a horizontal arm 35 which is pivotally attached to a counter-advancing-pawl or ratchet 36, which cooperates with the notched counter-rod 30. Each time the armature 23 is lifted by a sufficiently strong overcurrent-energization of the magnetizing coil 15, the horizontal arm 35 rises and tilts the counter-pawl 36 so that it engages one of the lifting-notches or shoulders 33 on the counter-rod 30, and then lifts this shoulder through a predetermined distance, thus constituting the first movement in the step-by- step vertical advance-movement of the counter-rod 30.

The top end of the counter-rod 30 is held in any one of a plurality of advanced positions by means of a holding-detent or pawl 37 which is spaced above the counter-pawl 36 and may be similar thereto. This holding-detent 37 is pivotally carried by a vertically movable arm 38, which is normally pressed downwardly by a diagrammatically indicated air-dashpot 40 mounted on bracket 3' by means of a support 40' having a spring 41 for biasing it in a downward direction, and having a valve-member 42 which permits rapid displacements in the upward direction, but only slow movements in the downward direction.

The holding-detent arm 38 is biased upwardly by a spring 43 which is weaker than the dashpot-spring 41, so that the dashpot 40 normally holds the arm 38 in its lowermost position, where it is in abutment with a suitable support 44 secured to bracket 31. Interposed between the top of this arm 38 and the depending dashpot-pin 45 is a vertically slidable member 46, which lies in the path of the top end of the armature-rod 25. A support 37' secured to bracket 3' is normally engaged by pawl 37 to hold it clear of shoulders 33.

When the armature 23 is lifted to its overcurrent-position, the top end of the armature-rod 25 lifts the slidable member 46 and pushes up the dashpot-pin 45 against the bias of the dashpot-spring 41, thus permitting the detent-arm 38 to be pushed upwardly by its spring 43. The upward movement of the detent-arm 38 rocks the holding-detent or pawl 37 into operative position under one of the notches or shoulders 33 of the counter-rod 30. As a result of this construction, when the armature 23 subsequently drops, during a no-current period, the holding-detent 37 remains elevated in its operative position, because the dashpot-pin 45 begins to lower itself at a very slow rate, determined by the design of the dashpot 40. On the other hand, the downward movement of the armature-rod 25 lowers the counter-advancing pawl 36 in readiness for another advance-stroke of the counter. Meanwhile, the holding-detent 37 holds the counter-rod in its first advanced position.

The foregoing operation is repeated each time the armature 23 rises to its attracted overcurrent-position, the dashpot-pin being pushed back to its uppermost position each time, if it has meanwhile moved downwardly appreciably, which ordinarily would not be the case.

When the counter-rod is advanced upwardly through a predetermined number of steps, on successively occurring overcurrent-impulses, the last upward movement of this counter-rod will trip out the latch-arm 13 and the latch-pin 11 which holds the interrupter-rod 6 in its closed upper position. In some applications of counter-mechanisms, this action could be accepted as the ultimate response to the integrator-operation. In sectionalizer-applications, however, as illustrated in the drawing, it is necessary to delay the final response to the integrator or counter until the magnetizing coil 15 is deenergized, so that the interrupter-rod 6 will open the circuit during a zero-current period.

According to our present invention, we therefore provide means for preventing the downward movement or response of the interrupter-rod 6, after it is unlatched by the integrator, until the armature 23 returns back from its advanced overcurrent-position. In the illustrated embodiment of our invention, the horizontal arm 35, which is carried by the upstanding armature-rod 25, is pivotally connected to a retainer-pawl 47. Each time the armature-rod 25 moves upwardly to the overcurrent-position, the horizontal arm 35 rocks the retainer-pawl 47 into position under a corresponding shoulder 48 on the interrupter-rod 6, and said horizontal arm 35 lifts this retainer-pawl up substantially to the underside of said shoulder 48. Thus, in the final integrator-operation, when the rod-holding latch-pin 11 is unlatched, the interrupter-rod 6 does not immediately fall, because this rod is temporarily held up by the retainer-latch 47 as just described. This holding-action continues until the magnetizing coil 15 is deenergized, whereupon the interrupter-rod 6 moves downward under the bias of its spring 7, and the top end of this interrupter-rod is moved out of contact with the stationary line-contact 5, thus effecting the interrupter-action of the line-sectionalizer.

It will readily be understood that if the prescribed number of overcurrent and undercurrent conditions do not follow each other in rapid succession, the dashpot 40 (or other equivalent time-delay device) will release the holding-detent 37, thus instantly resetting the counter-bar 30, ready for another count.

It will be observed that our present invention avoids the use of long-stroke, strong-action, time-delay devices, such as have heretofore been made applicable to the counter-rod 30. On the contrary, our invention uses a holding-detent 37 which is controlled by a small inexpensive, short-stroke, light-power dashpot 40 which affords adequte control for the necessary tilting or rocking movement of the holding-detent 37.

While we have described but a single illustrative form of embodiment of our invention, we wish it to be understood that we are not limited to the precise illustrated structure or combination, and we desire that the appended claims shall be accorded the broadest construction consistent with their language.

We claim as our invention:

1. A circuit interrupter comprising; separable contacts biased apart; releasable means for maintaining said contacts closed; an operating-member, solenoid means operable to actuate the movable member between a retracted position and an advanced position; a movable counter-member biased toward an inoperative position; a one-way drive-mechanism actuated by the operating-member to impart one step of a step-by-step advance to said counter-member each time said operating-member moves to its advanced position; a holding-detent operable to hold said counter-member in advanced positions; a time-delay device operable to make said holding-detent inoperative within a predetermined time after the counter-member is set in operation; and means actuated by the counter-member to effect release of the releasable means at the end of a predetermined number of repeated advance-steps of said counter-member.

2. An integrator-mechanism comprising: an operating-member movable between a retracted position and an advanced position; a movable counter-member biased toward an inoperative position; a one-way drive-mechanism operable to impart one step of a step-by-step advance to said counter-member each time said operating-member moves to its advanced position; a holding-detent activated by the operating-member to hold said counter-member in advanced positions; means including a time-delay device operable to make said holding-detent inoperative within a predetermined time after the counter-member is set in operation; a response-member biased toward a responding position; a latch normally holding said response-member from responding; means actuated by the counter-member, at the termination of its predetermined step-by-step advance, to release said latch; and means actuated by the operating-member in its advanced position to provide a temporary stop for preventing any substantial movement of the response-member in its responding direction.

3. In an interrupter; separable contacts; an operating-member movable between a retracted position and an advanced position; a movable counter-member biased toward an inoperative position; a one-way drive-mechanism activated by the operating-member to impart one step of a step-by-step advance to said counter-member each time said operating-member moves to its advanced position; a holding-detent operable to engage and hold said counter-member in advanced positions; a time-delay device effective to maintain said holding-detent operative for only a predetermined time after said time-delay device is set in such operation; means actuated by said operating-member in its advanced position to make said holding-detent operative and set said time-delay device in its aforesaid operation; and means actuated by the counter-member to effect separation of said contacts only at the end of a predetermined number of repeated advance-steps of said counter-member.

4. In an interrupter; separable contacts; an operating-member movable between a retracted position and an advanced position; a movable counter-member biased toward an inoperative position; a one-way drive-mechanism operable to impart one step of a step-by-step advance to said counter-member each time said operating-member moves to its advanced position; a holding-detent operable to engage and hold said counter-member in advanced positions; a time-delay device operatively connected with the holding-detent to make said holding-detent inoperative within a predetermined time after said time-delay device is set in such operation; means operated by said operating-member in each movement to its advanced position to make said holding-detent operative and set said time-delay device in its aforesaid operation; a response-member operable to actuate one of said contacts, said response member being biased toward a contact separating position; a latch normally holding said response-member from said separating position; means actuated by the counter-member at the termination of its predetermined step-by-step advance to release said latch; and means activated by the operating-member in advanced position to interpose a temporary block against any substantial movement of the response-member in its separating direction.

5. In a circuit interrupter; a fixed contact member; an operating-member movable between a retracted position and an advanced position; a movable counter-member biased toward an inoperative position; a one-way drive-mechanism actuated by the operating-member to impart one step of a step-by-step advance to said counter-member each time said operating-member moves to its advanced position; a holding-detent operable to hold said counter-member in advanced positions; a movable contact member biased away from the fixed contact member; a latch normally holding said movable contact member in contact with the fixed contact member; and means actuated by the counter-member, at the termination of its predetermined step-by-step advance, to release said latch.

6. An integrator-mechanism comprising: an operating-member movable between a retracted position and an advanced position; a movable counter-member biased toward an inoperative position; a one-way drive-mechanism actuated by the operating-member to impart one step of a step-by-step advance to said counter-member each time said operating-member moves to its advanced position; a holding-detent operable to engage and hold said counter-member in advanced positions; a response-member biased toward a responding position; a latch normally holding said response-member from responding; means actuated by the counter-member at the termination of its predetermined step-by-step advance to release said latch; and means actuated by the operating-member, in its advanced position, to temporarily prevent any substantial movement of the response-member in its responding direction.

7. A sectionalizing switch comprising: separable contacts; an electromagnet device having a magnetizing coil and an armature movable from a predetermined unattracted position to a predetermined attracted position in response to magnetic flux produced by a predetermined overcurrent in the coil; a movable counter-member biased toward an inoperative position; a one-way drive-mechanism operable in response to movement of the armature to impart one step of a step-by-step advance to said counter-member each time said armature moves to its overcurrent position; a holding-detent operable to engage and hold said counter-member in advanced positions; a time-delay device effective to make said holding-detent inoperative within a predetermined time after the counter-member is set in operation; and means actuated by the counter-member to effect separation of the contacts at the end of a predetermined number of repeated advance-steps of said counter-member.

8. An integrator-mechanism comprising: an electromagnet device having a magnetizing coil and an armature movable from a predetermined unattracted position to a predetermined attracted position in response to magnetic flux produced by a predetermined overcurrent in the coil; a movable counter-member biased toward an inoperative position; a one-way drive-mechanism actuated by the armature to impart one step of a step-by-step advance to said counter-member each time said armature moves to its overcurrent position; a holding-detent operable to hold said counter-member in advanced positions; a time-delay device activated by the armature to make said holding-detent inoperative within a predetermined time after the counter-member is set in operation; a response-member biased toward a responding position; a latch normally holding said response-member from responding; means actuated by the counter-member, at the termination of its predetermined step-by-step advance to release said latch; and means activated by the armature in its overcurrent position to interpose a temporary block and prevent any substantial movement of the response-member in its responding direction.

9. In a circuit interrupter; separable contacts; an electromagnet device having a magnetizing coil and an armature movable from a predetermined unattracted position to a predetermined attracted position in response to magnetic flux produced by a predetermined overcurrent in the coil; a movable counter-member biased toward an inoperative position; a one-way drive-mechanism activated by the armature to impart one step of a step-by-step advance to said counter-member each time said armature moves to its advanced positions; a time-delay device activated by the armature to make said holding-detent inoperative within a predetermined time after said time-delay device is set in such operation; means operable in response to each movement of the armature to its overcurrent position to make said holding-detent operative and set said time-delay device in its aforesaid operation; and means actuated by the counter-member to effect separation of said contacts at the end of a predetermined number of repeated advance-steps of said counter-member.

10. An integrator-mechanism comprising: an electromagnet device having a magnetizing coil and an armature movable from a predetermined unattracted position to a predetermined attracted position in response to magnetic flux produced by a predetermined overcurrent in the coil; a movable counter-member biased toward an inoperative position; a one-way drive-mechanism activated by the armature to impart one step of a step-by-step advance to said counter-member each time said armature moves to its overcurrent position; a holding-detent operable to engage and hold said counter-member in advanced positions; a time-delay device operable to make said holding-detent inoperative within a predetermined time after said time-delay device is set in such operation; means actuated by the armature upon each movement of the armature to its overcurrent position to make said holding-detent operative and set said time-delay device in its aforesaid operation; a response-member biased toward a responding position; a latch normally holding said response-member from responding; means actuated by the counter-member at the termination of its predetermined step-by-step advance to release said latch; and means activated by the armature in its overcurrent position to interpose a temporary block against any substantial movement of the response-member in its responding direction.

11. A circuit interrupter comprising: separable contacts; an electromagnet device having a magnetizing coil and an armature movable from a predetermined unattracted position to a predetermined attracted position in response to magnetic flux produced by a predetermined overcurrent in the coil; a movable counter-member biased toward an inoperative position; a one-way drive-mechanism actuated by the armature to impart one step of a step-by-step advance to said counter-member each time said armature moves to its overcurrent position; a holding-detent operable to engage and hold said counter-member in advanced positions; means biasing said contacts apart; a latch normally making said biasing means ineffective; and means actuated by the counter-member at the termination of its predetermined step-by-step advance to release said latch.

12. A circuit interrupter comprising: an electromagnet device having a magnetizing coil and an armature movable from a predetermined unattracted position to a predetermined attracted position in response to magnetic flux produced by a predetermined overcurrent in the coil; a movable counter-member biased toward an inoperative position; a one-way drive-mechanism activated by the armature to impart one step of a step-by-step advance to said counter-member each time said armature moves to its overcurrent position; a holding-detent operable to hold said counter-member in advanced positions; separable contacts; a response-member for actuating one of said contacts, said response member being biased toward a responding position; a latch normally holding said response-member from responding; means actuated by the counter-member at the termination of its predetermined step-by-step advance to release said latch; and means actuated by the armature in its overcurrent position to interpose a temporary block against any substantial movement of the response-member in its responding direction.

13. In a sectionalizing switch, a casing, separable contacts in said casing biased to separate, releasable means holding said contacts closed, a movable counter member advanceable from an initial position to release said releasable means, a handle projecting from said casing actuable to advance said counter member, electromagnetic means having a part movable in response to a predetermined current condition, a one-way drive mechanism actuated by the movable part to advance the counter member one step, means operable to retain the counter member in an advanced position for a predetermined time, means actuated by the counter member in response to a predetermined advance thereof greater than said one step to release the releasable means, and an additional handle projecting from the casing actuable to reclose said contacts.

ANDREW W. EDWARDS.
EARL F. BEACH.

References Cited in the file of this patent

UNITED STATES PATENTS

| Number | Name | Date |
|---|---|---|
| 1,728,983 | Sampson | Sept. 24, 1929 |
| 2,298,143 | May | Oct. 6, 1942 |
| 2,333,604 | Wallace | Nov. 2, 1943 |
| 2,387,372 | Watkins et al. | Oct. 23, 1945 |
| 2,414,786 | Lincks et al. | Jan. 21, 1947 |
| 2,442,477 | Wallace et al. | June 1, 1948 |
| 2,452,233 | Gerard et al. | Oct. 26, 1948 |
| 2,548,079 | Thompson et al. | Apr. 10, 1951 |